J. B. NORRIS.
PIPE COUPLING.
APPLICATION FILED JUNE 1, 1916.
1,219,849.
Patented Mar. 20, 1917.
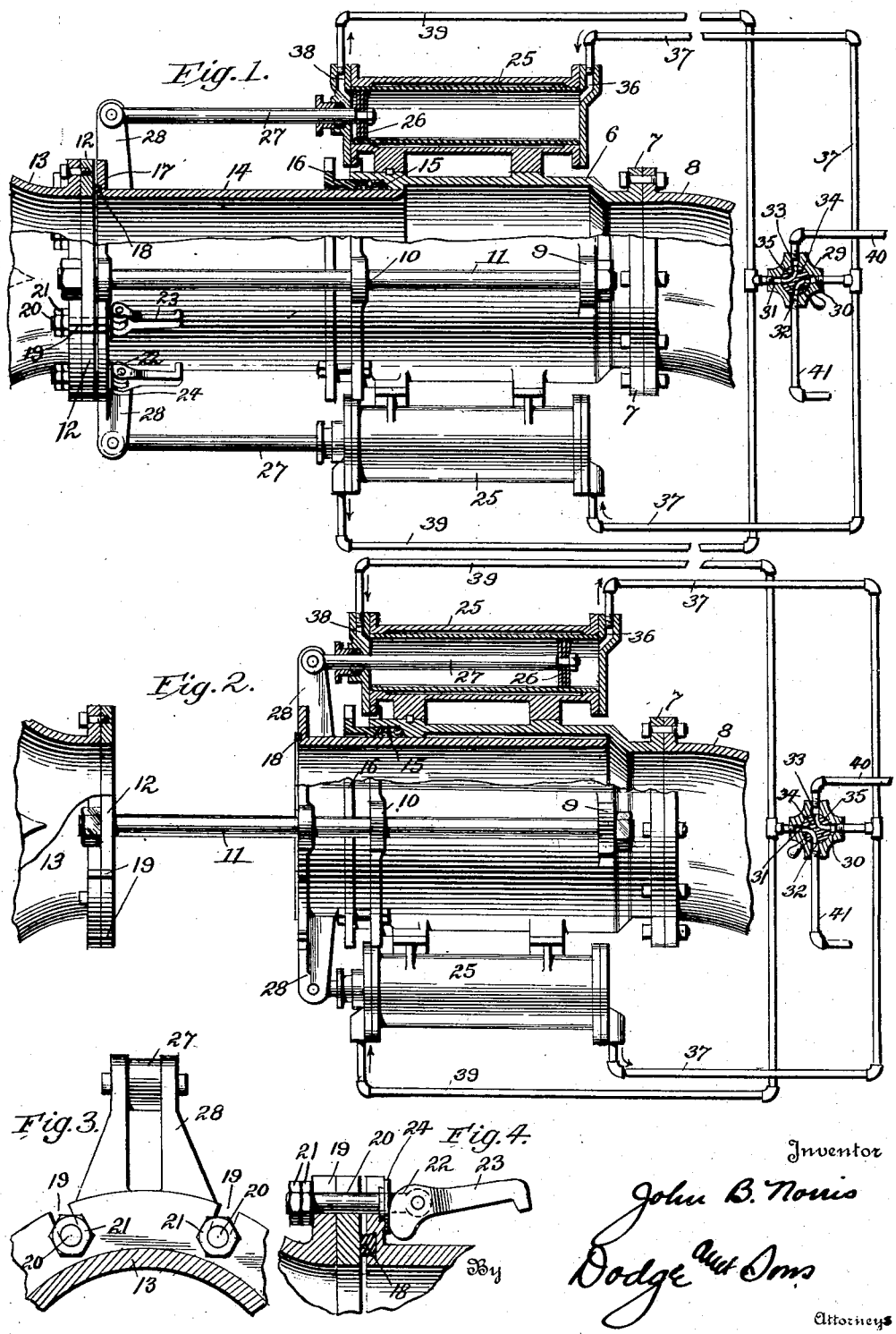

UNITED STATES PATENT OFFICE.

JOHN B. NORRIS, OF BALTIMORE, MARYLAND, ASSIGNOR TO ELLICOTT MACHINE CORPORATION, OF BALTIMORE, MARYLAND, A CORPORATION OF DELAWARE.

PIPE-COUPLING.

1,219,849.  Specification of Letters Patent.  Patented Mar. 20, 1917.

Application filed June 1, 1916. Serial No. 101,036.

*To all whom it may concern:*

Be it known that I, JOHN B. NORRIS, a citizen of the United States, residing at Baltimore, in the State of Maryland, have invented certain new and useful Improvements in Pipe-Couplings, of which the following is a specification.

This invention relates to pipe couplings and particularly to couplings suitable for use in connection with large pipes, such as suction pipes of dredges, to the interior of which it is commonly necessary to have quick access.

Stated in its broadest terms the invention consists of a shifting pipe section provided with suitable packing means, and some mechanism for shifting the pipe section. The preferred form of the invention consists of a telescopic section with fluid pressure actuating-means.

Accordingly I illustrate a device of this latter type in the accompanying drawings, in which:—

Figure 1 is an elevation, partly sectional, of the coupling in closed condition;

Fig. 2 is a similar view of the coupling in open condition;

Fig. 3 is a detail, fragmentary view showing a part of the clamping flange and two clamps in position; and Fig. 4 is a fragmentary section through the clamping flanges showing a clamp bolt in position.

The main portion of the device is a hollow shell 6, provided with a flange 7 to which may be bolted the flange of a pipe 8. This, in the example illustrated, is the suction pipe of the dredge. The shell 6 is provided with lugs 9 and 10 in which are mounted two rods 11. These are connected at their ends to a ring or flange 12, to which may be bolted the flange of any pipe 13. In the drawings the pipe 13 is the suction connection of a pump such as is commonly used in dredges. The shell 6, rods 11 and ring 12 thus form a rigid structure which is interposed between the pipes 8 and 13 and holds the same in spaced relation.

Slidably mounted in the shell 6 is a shiftable or telescoping pipe section 14 which makes a tight joint with the shell 6 by means of packing 15 compressed in a suitable gland by a follower ring 16. The forward end of the pipe section 14 is provided with a flange 17 which in the forward position of the pipe abuts against the ring or flange 12 and makes a tight joint therewith by means of a packing ring 18 mounted in the flange 17.

The flange on the pipe 13, the ring 12 and the flange 17 are provided with a number of radial slots or notches 19 in their periphery and in each of these is mounted a tension clamp. Each clamp consists of a bolt 20 provided with nuts 21 at one end and a pivoted cam 22 at the other end, adapted to place the bolt in tension and draw the flange 17 toward the ring 12. The initial adjustment is made by means of the nuts 21. Thereafter, the clamps are stressed or released by turning the cams 22 by means of the lever arms 23. Each cam 22 bears upon a washer 24 surrounding the bolt 20 and resting upon the flange 17. This clamping means is used when the pipe coupling is to remain closed for some time, and it is undesirable to keep the power operating device under pressure.

The power operating device consists of two cylinders 25 mounted on the shell 6 with their axes parallel to the axis of the shell 6 and telescoping section 14. The pistons 26 in the cylinders 25 are connected to the usual rods 27 and these in turn are connected to arms or yokes 28 on the telescoping section 14.

The power cylinders are controlled by a four-way valve 29 which has in its shell four ports 30, 31, 32 and 33, arranged at 90° intervals. The rotary plug 34 of the valve 29 is provided with curved ports 35 which may simultaneously connect similar pairs of ports in the valve 29. The head-end ports 36 of the cylinders 25 are connected by pipes 37 to the port 30. The rod-end ports 38 of the cylinders 25 are connected by pipes 39 to the port 31, which is directly opposite to the port 30. The port 33 is connected to a vent pipe 40 and the port 32 which is opposite the port 33 is connected to a supply pipe 41, which conducts pressure fluid from any suitable source. Any suitable pressure fluid might be used, such for example, as steam, compressed air or water.

With the valve in the position shown in Fig. 1 the head end of the cylinders 25 is connected to pressure supply and the rod end to exhaust, so that the telescoping section 14 is forced to the left and seals against the ring 12. The pressure exerted by the cylinders is sufficient to maintain a sealed joint but, as already suggested, the clamps 20 can commonly be applied to advantage. Since the flange 17 is urged against the ring 12 with a sealing pressure, the clamps may easily be applied to maintain this pressure.

After first removing the clamps, if these are used, the valve may be shifted to the position shown in Fig. 2 in which the rod-ends of the cylinders are connected to supply and the head-ends to exhaust, thus shifting the telescoping section 14 to the right to give ready access to the interior of the pipes.

Various modifications of the structure may be made without departing from the spirit of the invention. The particular four-way valve structure illustrated is intended primarily for illustration, and I contemplate the use of any of the various controlling valve mechanisms now in common use.

Having thus described my invention, what I claim is:—

1. The combination of a frame provided with means for connecting two pipe sections thereto with an interval between their ends; an intermediate bridging section, movably mounted in and guided by said frame, and capable of connecting said sections by bridging said interval; and a motor operatively connected with said frame and bridging section, to move the latter to and from bridging position.

2. The combination of a frame provided with means for connecting two pipe sections thereto with an interval between their ends, and with a gland communicating with one of said pipe sections; an intermediate bridging section, mounted to telescope into said gland, and adapted when projected therefrom to bridge the interval between said sections; and a motor operatively connected with said frame and bridging section to move the latter to and from bridging position.

3. The combination of a frame provided with means for connecting two pipe sections thereto with an interval between their ends; an intermediate bridging section, movably mounted in and guided by said frame, and capable of connecting said sections by bridging said interval; a motor operatively connected with said frame and bridging section, to move the latter to and from bridging position; and quick-releasable clamping means for positively holding said bridging section in bridging position.

4. The combination of a frame provided with means for connecting two pipe sections thereto in spaced relation and provided with an abutment associated with one of said connecting means and a chamber associated with the other of said connecting means; a tubular bridging section in telescoping relation with said chamber and adapted when projected to enter into sealing engagement with said abutment; and a pressure motor, operable at will, to hold said telescoping section against said abutment or to telescope it with reference to said chamber.

5. The combination of a frame provided with means for connecting two pipe sections thereto in spaced relation and provided with an abutment associated with one of said connecting means and a chamber associated with the other of said connecting means; a tubular bridging section in telescoping relation with said chamber and adapted when projected to enter into sealing engagement with said abutment; a pressure motor, operable at will, to hold said telescoping section against said abutment or to telescope it with reference to said chamber; and releasable clamping means between said telescoping section and said abutment.

In testimony whereof I have signed my name to this specification.

JOHN B. NORRIS.